United States Patent Office 2,873,280
Patented Feb. 10, 1959

2,873,280

PHTHALOCYANINE-SULFONAMIDES AND PROCESS FOR THEIR MANUFACTURE

Berthold Bienert, Leverkusen-Bayerwerk, Kurt Breig, Köln-Stammheim, and Manfred Groll, Köln-Mülheim, Germany, assignors to Farbenfabriken Bayer Aktiengesellschaft, Leverkusen, Germany, a corporation of Germany No Drawing. Application October 9, 1956
Serial No. 614,798

Claims priority, application Germany October 11, 1955

5 Claims. (Cl. 260—314.5)

The present invention relates to phthalocyanine sulfonamides and to a process for their manufacture; more particularly it relates to coupling phthalocyanine-sulfonamides of the following formula

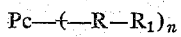
$$Pc-(-R-R_1)_n$$

wherein Pc stands for a phthalocyanine radical, R means a —$SO_2$— or —CO-group, $R_1$ stands for amino group containing organic radical being linked to the radical R via the amino group and bearing a coupling position in the molecule, and n means an integer from 1 to 4.

In accordance with the invention it has been found that valuable phthalocyanine-sulfonamides which are capable of coupling may be obtained by reacting, preferably in an organic medium, phthalocyanine-sulfonic acid or carboxylic acid halides, with amines which contain in the molecule a coupling position, if desired together with non-coupling amines, in such a proportion that there is at least one amino group for each acid-halide group of the phthalocyanine.

As phthalocyanines there may be considered metal-free phthalocyanines or those having a metal as the central atom, preferably copper, nickel or cobalt. The phthalocyanines may contain the reactive sulfonic acid halide or carboxylic acid halide groups in the benzene nuclei of the macrocyclic ring, or located in annellated aromatic rings or in aryl radicals which are linked to the macrocyclic phthalocyanine ring directly or via bridging atoms such as —SO—, —$SO_2$— or —NH—. Among the acid halides the acid chlorides are of special interest.

As amines which can be reacted with the acid halide groups of the phthalocyanine molecule, there may be used primary or secondary aliphatic, aromatic or heterocyclic amines which contain in the molecule a coupling position, for example aminophenols, aminonaphthols, aminonaphtholcarboxylic acid arylides, aminoacyl-acetamides or phenyl-pyrazolones containing amino groups. Either all the acid halide groups or only part of the acid halide groups may react with the amine capable of coupling. Unreacted halogen atoms may subsequently be reacted by known methods with ammonia or with other non-coupling amines. Apart from the sulfonamide groups, the phthalocyanine residues may also contain other non-ionic substituents, such as halogen, nitro-, alkyl, alkoxy-, or acyl-amino-groups.

The reaction between the phthalocyanine-sulfonic acid halides or phthalocyanine-carboxylic acid halides and the amines is preferably carried out in an organic medium, such as chlorobenzene, nitrobenzene, alcohols, or dimethyl formamide, in order to prevent hydrolysis of the acid halide groups.

The new phthalocyanine-sulfonamides which are obtainable according to the present invention are themselves suitable for the dyeing of vegetable fibres. They are preferably employed, however, as intermediate products for the preparation of azo dyestuffs.

The following examples are given for the purpose of illustrating the invention without, however, limiting it thereto.

Example 1

17.4 parts by weight of Cu-phthalocyanine-(3)-trisulfochloride and 36 parts by weight of 1-(4'-aminophenyl)-3-methyl-pyrazolone-(5) are added to 300 parts by weight of chlorobenzene; the mixture is then heated to 90–95° C., and stirred until the reaction is completed. Then a little ligroin is added, the product is filtered off by suction and washed with petroleum ether. After stirring with sodium bicarbonate solution, and if necessary after boiling with dilute hydrochloric acid, the reaction product is obtained in quantitative yield.

A reaction product with similar properties can be obtained on replacement of the 1-(4'-aminophenyl)-3-methyl-pyrazolone-(5) by 1-(3'-aminophenyl)-3-methyl-pyrazolone-(5).

Example 2

12 parts by weight of diphenyl-Cu-phthalocyanine-tetra-sulfochloride (obtained by treating the sintering product of 1 mol each of phthalodinitrile, 3,4-dicyanodiphenyl, and cuprous chloride with chlorsulfonic acid at 140° C. for 3 hours) and 30 parts by weight of 1-(4'-aminophenyl)-3-methylpyrazolone-(5) are added to 200 parts by weight of nitrobenzene, and the mixture is stirred at 90° C. until the reaction is completed. Ligroin is then added, and the reaction product is filtered off by suction, washed with petroleum ether, stirred up with sodium bicarbonate solution, and finally boiled out with dilute hydrochloric acid.

The product is obtained in quantitative yield. In this example, the 1-(4'-aminophenyl)-3-methyl-pyrazolone-(5) may be replaced by 1-(3'-aminophenyl)-3-methyl-pyrazolone-(5), and the nitrobenzene may be replaced by o-dichlorobenzene or by chlorobenzene.

Example 3

14.6 parts by weight of Cu-phthalocyanine-(4)-tetra-sulfochloride and 36 parts by weight of 1-(4'-aminophenyl)-3-methyl-pyrazolone-(5) are added to 200 parts by weight of chlorobenzene, and the mixture is stirred at 90–95° C. until the reaction is complete. The chlorobenzene is distilled off in a Venuleth under reduced pressure, the powder thus obtained is treated with cold sodium bicarbonate and then with hot dilute hydrochloric acid; the reaction product is obtained in very good yield.

A product with similar properties is obtained by the use of 1-(3'-aminophenyl)-3-methyl-pyrazolone-(5) instead of the 4'-aminophenyl-compound.

Example 4

17.4 parts by weight of Cu-phthalocyanine-(3)-trisulfochloride and 36 parts by weight of 1-(4'-aminophenyl)-3-methyl-pyrazolone-(5) are added to 200 parts by weight of dimethyl formamide. The mixture is stirred at 20–30° C. for 20 hours and then at 50° C. for 1–2 hours. The melt is then poured into water and warmed to 80° C., the product being filtered off by suction and washed with water. The residue is boiled out with dilute hydrochloric acid, filtered off by suction and washed neutral. The desired product is obtained in quantitative yield.

In place of the 1-(4'-aminophenyl)-3-methyl-pyrazolone-(5), the corresponding 3'-aminophenyl-compound may be employed.

Example 5

27 parts by weight of 1-(4'-aminophenyl)-3-methyl-pyrazolone-(5) are stirred into 22 parts by weight of dimethyl formamide and 18.5 parts by weight of methanol. 17.4 parts by weight of Cu-phthalocyanine-(3)-trisulfochloride are added at 15–20° C. and the reaction mixture is stirred for about 24–36 hours until the reaction is complete. The melt is then stirred into 120 parts by weight of methanol, the reaction product filtered off by suction, washed with 35 parts by weight of methanol, stirred up with 250 parts by weight of water and 50 parts by weight of hydrochloric acid at 60° C., filtered off by suction, washed until neutral and dried. The reaction product is obtained in very good yield; it is readily soluble in sodium hydroxide solution.

If 1-(3'-aminophenyl)-3-methyl-pyrazolone-(5) is employed instead of 1-(4'-aminophenyl)-3-methyl-pyrazolone-(5) the properties of the reaction product are closely similar.

Similar results can be obtained when the Cu-phthalocyanine-(3)-trisulfochloride is replaced by Ni-phthalocyanine-(3)-trisulfochloride.

Example 6

13 parts by weight of 1-(4'-aminophenyl)-3-methyl-pyrazolone-(5) are stirred into 22 parts by weight of dimethyl formamide and 18.5 parts by weight of methanol. 17.4 parts by weight of Cu-phthalocyanine-(3)-trisulfochloride are added at 15–20° C., and the reaction mixture is stirred at 25° C. According to the progress of reaction, 6 parts by weight of anhydrous sodium carbonate are slowly added, and stirring is continued for 24–36 hours until the reaction is complete. After the addition of a little hydrochloric acid the product is worked up by the method described in the first paragraph of Example 5.

Reaction products with similar properties are obtainable by replacing 1-(4'-aminophenyl)-3-methyl-pyrazolone-(5) by the corresponding (3'-aminophenyl)-derivative, or Cu-phthalocyanine-(3)-trisulfochloride by Ni-phthalocyanine-(3)-trisulfochloride, or sodium carbonate by other acid binding agents, such as triethylamine, sodium acetate, and others.

Example 7

34 parts by weight of 1-(3'-aminophenyl)-3-methyl-pyrazolone-(5) are stirred into 42 parts by weight of dimethyl formamide and 35 parts by weight of methanol. 19.4 parts by weight of Ni-phthalocyanine-(3)-tetrasulfochloride are added at 15–20° C., and the reaction mixture is stirred at 25° C. for about 40–50 hours until the reaction is complete. The melt is then poured into 150 parts by weight of methanol to precipitate the reaction product which is filtered off by suction, washed with methanol, stirred up at 60° C. with 250 parts by weight of water and 50 parts by weight of hydrochloric acid, filtered off with suction and washed neutral. The reaction product is obtained in very good yield as a turquoise blue powder, and is readily soluble in sodium hydroxide solution.

If instead of 1-(3'-aminophenyl)-3-methyl-pyrazolone-(5) 1-(4'-aminophenyl)-3-methyl-pyrazolone-(5) is used, a reaction product is obtained having similar properties.

Similar reaction products are also obtainable if Cu-phthalocyanine-(3)-tetrasulfochloride is condensed with 1-(4'-aminophenyl)-3-methyl-pyrazolone-(5) or with the 1-(3'-aminophenyl)-derivative in a similar manner.

Example 8

34 parts by weight of 3-aminobenzoyl-acetanilide are stirred into 47 parts by weight of dimethyl formamide and 22 parts by weight of methanol, and 17.4 parts by weight of Cu-phthalocyanine-(3)-trisulfochloride are added at 20–25° C. The mixture is then stirred at 25–30° C. for 40–50 hours; then the melt is poured into 150 parts by weight of methanol. The product is filtered off by suction and briefly washed with methanol. The reaction product is purified by stirring up with 700 parts by weight of diluted hydrochloric acid (1:10) at 80–90° C., filtering off by suction and washing until neutral.

Example 9

17.4 parts by weight of Cu-phthalocyanine-(3)-trisulfochloride are added to 22 parts by weight of dimethyl formamide and 18 parts by weight of methanol. 7 parts by weight of methanol containing 1.8 parts by weight of dimethylamine in solution are then added at 15–20° C. The mixture is stirred at 15–20° C. for 1 hour. 18 parts by weight of 1-(4'-aminophenyl)-3-methyl-pyrazolone-(5) are then added, and the reaction mixture is maintained at 25° C. until the reaction is complete. The product is worked up as detailed in Example 5, by stirring the melt into methanol, filtering off by suction, and stirring the reaction product with dilute hydrochloric acid.

A similar product can be obtained if instead of 1-(4'-aminophenyl) - 3 - methyl - pyrazolone - (5) equivalent amounts of 1-(3'-aminophenyl)-3-methyl-pyrazolone-(5) are used.

Methylamine may also be used instead of dimethylamine, with good results. Reaction products with similar properties are obtainable by replacing the Cu-phthalocyanine-(3)-trisulfochloride in this example by the corresponding Ni-derivative.

Example 10

33 parts by weight of acetoacetic-acid-(2'-methoxy-4'-amino-5'-chlorophenyl)-amide are stirred into 22 parts by weight of dimethyl formamide and 19 parts by weight of methanol. 17.4 parts by weight of Ni-phthalocyanine-(3)-trisulfochloride are added with stirring at 15–20° C., and stirring is continued at 25° C. for 50–60 hours. The melt is then added to 150 parts by weight of methanol, the reaction product is filtered off by suction, washed with methanol, purified by stirring at 60° C. with 250 parts by weight of water and 50 parts by weight of hydrochloric acid, filtered off by suction, and washed until neutral. A turquoise blue powder is obtained in very good yield; it is soluble in dilute sodium hydroxide solution.

A similar product can be obtained by using the corresponding Cu-derivative in place of Ni-phthalocyanine-(3)-trisulfochloride.

The acetoacetic - acid-(2'-methoxy-4'-amino-5'-chlorophenyl)-amide employed in this example may be replaced by acetoacetic-acid-(4'-aminophenyl)-amide to yield a reaction product with similar properties.

Example 11

34 parts by weight of 1-(4'-aminophenyl)-3-methyl-pyrazolone-(5) are stirred into 22 parts by weight of dimethyl formamide and 18.5 parts by weight of methanol. 19.4 parts by weight of Cu-phthalocyanine-(4)-tetrasulfochloride are added at 15–20° C. After stirring for some 30 hours at 25° C., the melt is poured into 150 parts by weight of methanol, and the product is filtered off by suction and briefly washed with methanol. The reaction product is stirred up at 60° C. with 250 parts by weight of water and 50 parts by weight of hydrochloric acid, filtered off by suction and washed neutral.

Similar products are obtainable with Ni-phthalocyanine-(4)-tetrasulfochloride or with Cu-phthalocyanine-(4)-tetrasulfochloride.

Example 12

17.4 parts by weight of Cu-phthalocyanine-(3)-trisulfochloride are stirred at 15° C. into 22 parts by weight of dimethyl formamide and 19 parts by weight of methanol. 2.8 parts by weight of m-nitraniline are then added at 20–25° C. and mixture is stirred for 2 hours. 4 parts by weight, and after a further 3 hours another 18 parts by weight of 1-(4'-aminophenyl)-3-methyl-pyrazolone-(5) are added, and the reaction mixture is stirred at 25° C. for another 30 hours. The product is worked up with methanol and hydrochloric acid as described in Example 5.

Similar results can be obtained by using p- or o-nitraniline instead of m-nitraniline.

Example 13

22.5 parts by weight of diphenyl-Cu-phthalocyanine-tetrasulfochloride (obtained by treatment of diphenyl-Cu-phthalocyanine with chlorosulfonic acid at 140° C. and subsequently with thionyl chloride at 90° C.) are stirred at 15° C. into 35 parts by weight of dimethylformamide and 30 parts by weight of methanol. After cooling to 5° C., 12 parts by weight of methanol containing 2.4 parts by weight of methylamine in a solution are run in during ½ hour. Stirring is continued at 8–10° C. for 2 hours, and 18 parts by weight of 1-(4'-aminophenyl)-3-methyl-pyrazolone-(5) are then added at 15–20° C., the reaction taking place at 25° C. during 30 hours. The product is worked up with methanol and dilute hydrochlororic acid according to the procedure given in Example 5. The bluish green powder obtained in very good yield is soluble in dilute sodium hydroxide solution.

A similar product can be obtained if instead of 1-(4'-aminophenyl)-3-methyl-pyrazolone-(5) the corresponding 1-(3'-aminophenyl)-derivative is employed.

Example 14

39 parts by weight of 2-hydroxynaphthalene-3-carboxylic-acid-(3'-aminophenyl)-amide are stirred at 15–20° C. into 25 parts by weight of dimethyl formamide and 25 parts by weight of methanol, and 17.4 parts by weight of Cu-phthalocyanine-(3)-trisulfochloride are added. After stirring at 30° C. for 30 hours the melt is added to methanol, the product is filtered off by suction, washed with methanol, stirred up at 60° C. with 250 parts by weight of methanol and 30 parts by weight of dimethyl formamide, filtered off by suction, and washed with a mixture of dimethyl formamide and methanol.

Example 15

26 parts by weight of 1-amino-7-hydroxynaphthalene, and subsequently at 20–25° C. 17.4 parts by weight of Ni-phthalocyanine-(3)-trisulfochloride are stirred into 40 parts by weight of dimethyl formamide and 20 parts by weight of methanol. The temperature is maintained at 25–30° C. for 30 hours; then the melt is added to 180 parts by weight of methanol, the reaction product is filtered off by suction, briefly washed with methanol, and purified with dilute hydrochloric acid as in Example 5.

Example 16

17.4 parts by weight of Cu-phthalocyanine-(3)-trisulfochloride are stirred at 15° C. into 30 parts by weight of dimethyl formamide and 30 parts by weight of methanol; 6.2 parts by weight of 4-amino-4'-nitrodiphenylamine-2'-sulfonamide are added, and the temperature is maintained at 20–25° C. for 2 hours. 4 parts by weight and, after a further 2 hours another 16 parts by weight of 1-(4'-aminophenyl)-3-methyl-pyrazolone-(5) are then added. After 30 hours, the melt is poured into 150 parts by weight of methanol, and the reaction product is filtered off by suction, briefly washed with methanol, purified by stirring up with 600 parts by weight of water and 60 parts by weight of hydrochloric acid at 90–95° C., filtered off by suction, and washed until neutral. A bluish green powder is obtained in very good yield; it dissolves in dilute sodium hydroxide solution with a green coloration.

The corresponding Ni-derivative may be employed instead of the Cu - phthalocyanine - (3) - trisulfochloride, yielding a similar product. Similar reaction products can also be obtained on replacement of the 4-amino-4'-nitrodiphenylamine - 2' - sulfonamide by the corresponding methyl sulfonamide or dimethyl sulfonamide.

Example 17

36 parts by weight of 1-(4'-methylaminophenyl)-3-methyl-pyrazolone-(5) are stirred into 27 parts by weight of dimethylformamide and 18.5 parts by weight of methanol. 19.4 parts by weight of Ni-phthalocyanine-(3)-tetrasulfochloride are added at 5–10° C. and the mixture is stirred at 10–20° C. until the reaction is complete. The melt is then stirred into 120 parts by weight of methanol, the product filtered off by suction, stirred with diluted hydrochloric acid at 60° C., filtered off by suction and washed neutral.

Example 18

13 parts by weight of 1-(3'-aminophenyl)-3-methyl-pyrazolone-(5), and subsequently 17.4 parts by weight of Ni-phthalocyanine-(3)-trisulfochloride are stirred at 10° C. into 22 parts by weight of dimethyl formamide and 18 parts by weight of methanol. After stirring at 25° C. for 4 hours, 13 parts by weight of 1-(4'-aminophenyl)-3-methyl-pyrazolone-(5) are added. After a further 30 hours, the product is worked up as in Example 5.

Example 19

19.4 parts by weight of Ni-phthalocyanine-(3)-tetrasulfochloride, and subsequently 16 parts by weight of 1-(3'-aminophenyl)-3-methylpyrazolone-(5), are added with stirring to 33 parts by weight of dimethyl formamide and 30 parts by weight of methanol. After the reaction has been proceeding at 25° C. for 14 hours, 21 parts by weight of aceto acetic acid-(2'-methoxy-4'-amino-5'-chlorophenyl)-amide are added, and stirring is continued at 25–30° C. for a further 30 hours. The melt is then added to methanol, and the reaction product is filtered off by suction, briefly washed with methanol, purified by stirring at 90–95° C. with 600 parts by weight of water and 60 parts by weight of hydrochloric acid, filtered off by suction, and washed until neutral.

A similar reaction product is obtained if the acetoacetic acid derivative specified in the first paragraph is replaced by the equivalent amount of 3'-aminobenzoyl-acetanilide.

The coupling phthalocyanine-sulfonamide obtainable according to the first paragraph of this example can be applied to the preparation of a green print according to the following procedure:

The coupling component is mixed with an amount equivalent to its coupling power with the diazoamino-compound prepared from diazotized 1-amino-2-methyl-4,5-dichlorobenzene and 2-ethylamino-4-sulfonbenzoic acid. 60 parts by weight of this mixture are stirred with 100 parts by volume of a diluted hydroxide solution (concentrated sodium hydroxide at 38° Bé. diluted in the proportion 1:10). The solution is stirred into a mixture of 500 parts by weight of starch-tragacanth thickening and 240 parts by volume of water. This printing paste yields on cotton or regenerated cellulose a green print by neutral or acid steaming.

In a similar manner the phthalocyanine-sulfonamide coupling components obtained according to the foregoing examples may be applied to the preparation of prints on cotton or regenerated cellulose.

We claim:
1. Phthalocyanine-amide corresponding to the formula

wherein Pc stands for a phthalocyanine radical, R means a radical selected from the group consisting of —$SO_2$— and —CO—, $R_1$ stands for a radical selected from the groups consisting of aminophenyl pyrazolone, aminobenzoyl acetic acid anilide, aceto acetic acid (aminophenyl)-amide, 2-hydroxynaphthalene-3-carboxylic acid (aminophenyl)-amide and amino-hydroxynaphthalene radicals, said radical being linked to the radical R via the amino-group and containing a coupling position, and $n$ stands for an integer from 1 to 4.

2. A process for the preparation of a phthalocyanine amide which comprises reacting a compound selected from the group consisting of a phthalocyanine sulfonic acid halide and a phthalocyanine carboxylic acid halide with an amino-containing compound selected from the groups consisting of amino-phenyl-pyrazolones, amino-benzoyl acetic acid anilides, aceto acetic acid (amino-phenyl)- amides, 2-hydroxynaphthalene-3-carboxylic acid (amino-phenyl)-amides and amino-hydroxynaphthalenes, said amino-containing compound having a coupling position.

3. The process of claim 2 wherein a member selected from the group consisting of ammonia and alkyl amines is also employed to amidate all the excess acid halide groups in the phthalocyanine acid halide.

4. The process of claim 2 wherein the reaction is carried out in an organic medium.

5. The process of claim 3 wherein the reaction is carried out in an organic medium.

References Cited in the file of this patent

UNITED STATES PATENTS

| | | |
|---|---|---|
| 2,285,359 | Rosch et al. | June 2, 1942 |
| 2,459,773 | Mayhew | Jan. 18, 1949 |
| 2,613,128 | Baumann et al. | Oct. 7, 1952 |
| 2,744,914 | Rosch et al. | May 8, 1956 |
| 2,756,119 | Baumann et al. | July 24, 1956 |